US007862324B2

(12) United States Patent
Jones et al.

(10) Patent No.: US 7,862,324 B2

(45) Date of Patent: Jan. 4, 2011

(54) SOLID INK STICK FORMATION WITH FLEXIBLE MOLDING TOOL

(75) Inventors: Brent Rodney Jones, Sherwood, OR (US); Brian Walter Aznoe, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 246 days.

(21) Appl. No.: 11/728,780

(22) Filed: Mar. 27, 2007

(65) Prior Publication Data

US 2008/0237940 A1 Oct. 2, 2008

(51) Int. Cl.
*B29C 59/00* (2006.01)

(52) U.S. Cl. .............................. 425/436 RM; 425/215; 425/422

(58) Field of Classification Search ................. 425/218, 425/220, 215, 422, 436 RM, 806; 249/66.1
See application file for complete search history.

(56) References Cited

U.S. PATENT DOCUMENTS 4,200,658 A 4/1980 Katzman et al.
5,639,416 A 6/1997 Pennisi et al.
6,228,304 B1 5/2001 Silbergeld
6,692,668 B2 * 2/2004 Ogrinc et al. ................. 264/28
2006/0037975 A1 * 2/2006 Suffa .......................... 222/490

FOREIGN PATENT DOCUMENTS

WO WO 2006/082014 * 8/2006

* cited by examiner

*Primary Examiner*—Khanh Nguyen
*Assistant Examiner*—John Blades
(74) *Attorney, Agent, or Firm*—Maginot, Moore & Beck LLP

(57) ABSTRACT

A molding tool is provided for forming solid ink sticks. The molding tool comprises a vessel having at least one sidewall defining a cavity for receiving molten phase change ink material. The molding tool includes a lid for covering an opening over the cavity of the vessel. The lid has an interior surface for at least partially enclosing the cavity. The enclosed cavity has a shape corresponding to at least a portion of an ink stick shape. The at least one sidewall of the vessel and/or the interior surface of the lid are configured to flex to facilitate release of an at least partially solidified ink stick from the cavity.

7 Claims, 8 Drawing Sheets

SOLID INK STICK FORMATION WITH FLEXIBLE MOLDING TOOL

TECHNICAL FIELD

This disclosure relates generally to phase change ink jet printers, the solid ink sticks used in such ink jet printers, and the methods used to fabricate such ink sticks.

BACKGROUND

Solid ink or phase change ink printers conventionally receive ink in a solid form, either as pellets or as ink sticks. The solid ink pellets or ink sticks are placed in a feed chute and a feed mechanism operates to deliver the solid ink, hereafter may be referred to as sticks or ink, though a feed chute to a heater assembly. The feed mechanism may be configured to use gravity or a mechanical bias to urge the ink through the feed chute so they impinge upon a heater plate in the heater assembly. The heater plate melts the solid ink impinging on the plate into liquid ink that is collected and delivered to a print head for jetting onto a recording medium. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al. describe exemplary systems for delivering solid ink sticks into a phase change ink printer.

Phase change or solid inks for color printing typically comprise an ink carrier composition that is combined with compatible colorants. In a specific embodiment, a series of colored inks can be formed by combining ink carrier compositions with compatible colorants. The resulting subtractive solid ink primary-colors may be melted to yield the typical color set, namely, cyan, magenta, yellow and black, although other colors may be produced.

Ink sticks historically in use are manufactured with a formed tub and flow fill process. In this method, the ink compound is poured into a tub having an interior shape corresponding to the desired finished ink stick shape. The tub may also be formed with indentations and protrusions for forming keying and coding features in the ink sticks, if desired. This manufacturing method allows formation of ink sticks with inset features and contours at the bottom and sides of the stick, but may produce a stick periphery with imprecise tolerance control and limited complexity. Sharply defined features and undercut features that are transverse to the removal direction of the ink sticks from the tubs are difficult to preserve during extraction of a stick.

This method is also ineffective for controlling height or forming features in the upper surface of a stick. Because the top of the forming tub remains open during the process, the top surface of the ink material may solidify without uniformity. Liquid ink shrinks in volume as it cools and this size change deforms the ink and generates stress. Non uniform cooling exacerbates this tendency. Consequently, the top surface may include cracks and congeal with an irregular shape. These irregularities may result in handling fragility. In some instances, the height variation may be significant enough to adversely affect loading and transport of the stick.

Pour molding may be used with molding tools instead of a tub as described above. Typical molding tools are generally rigid and made from a heat tolerant, machinable material, such as aluminum or steel. The physical properties of the ink material, which is intended to adhere to media such as paper and transparencies, may cause the ink to adhere to the cavity of a typical molding tool. The wax-like nature of the ink material may be difficult to eject from the tool. Small volumes of ink can be torn away from the ink stick body and remain in the tool following ink stick extraction. Long cool down periods and/or low friction release coatings, such as, for example, polytetrafluoroethylene (PTFE), may help reduce the likelihood of ink sticking to a tool. Release coatings add cost, gradually deteriorate and do not solve stick geometry limitation problems.

SUMMARY

In order to address the difficulties associated with the previously known flow fill methods of manufacturing solid ink sticks, an improved molding tool that facilitates the removal of solid ink sticks with enhanced form feature complexity has been developed. The molding tool comprises a vessel having at least one sidewall defining a cavity for receiving molten phase change ink material. The molding tool includes a lid for covering an opening over the cavity of the vessel. The lid has an interior surface for at least partially enclosing the cavity. The enclosed cavity has a shape corresponding to at least a portion of an ink stick shape. The at least one sidewall of the vessel and/or the interior surface of the lid are configured to flex to facilitate release of an at least partially solidified ink stick from the cavity.

In another embodiment, a system for forming solid ink sticks comprises at least one flexible molding tool comprising a vessel having a sidewall defining a cavity for receiving molten phase change ink material, and a lid for enclosing the cavity. The enclosed cavity defines at least a portion of an ink stick shape. The flexible molding tool is at least partially formed of a flexible, temperature resistant material such that at least one of the sidewall and the lid are configured to flex to facilitate release of an at least partially solidified ink stick from the cavity. The system also includes a molten phase change ink dispenser for introducing molten phase change ink material into the at least one cavity of the at least one flexible molding tool.

In yet another embodiment, a method of forming solid ink sticks is provided. The method comprises introducing molten ink material into a cavity of a flexible molding tool. A lid is then placed over the cavity to enclose the molten ink material therein. The enclosed cavity has an internal shape corresponding to at least a portion of an ink stick shape. At least a portion of the flexible molding tool is flexed to facilitate release of an at least partially solidified ink stick from the cavity.

The systems and methods, described in more detail below, enable the formation of a solid ink stick that has good height control and consistent shape, as well as the ability to form complex features such as keying, alignment and orientation features. Other benefits and advantages of the system for forming solid ink sticks will become apparent upon reading and understanding the following drawings and specification.

DETAILED DESCRIPTION OF THE PREFERRED EMBODIMENT

Figure 1:
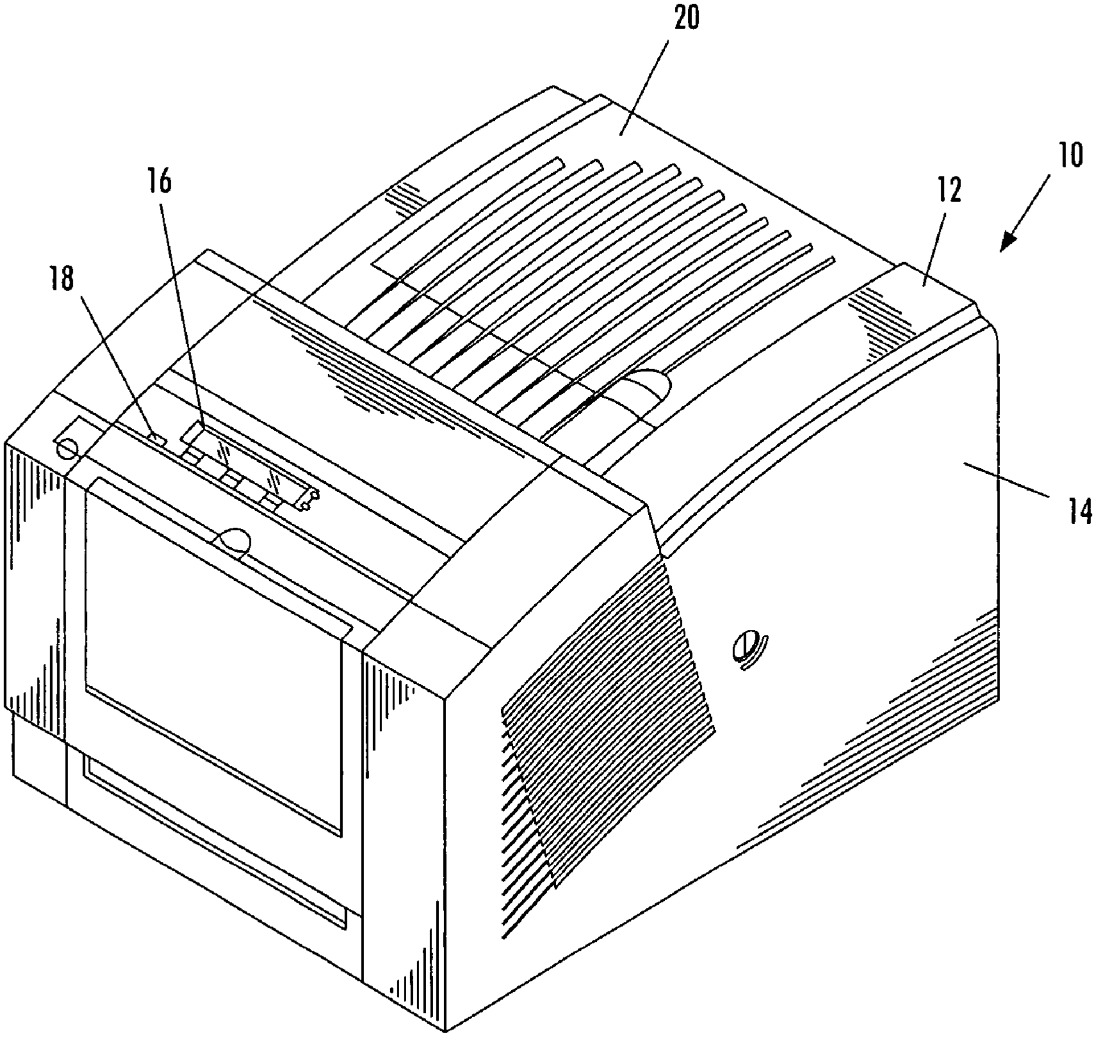
FIG. 1 PRIOR ART
FIG. 1 is a perspective view of a prior art phase change printer with the printer top cover closed.

For a general understanding of the present embodiments, reference is made to the drawings. In the drawings, like reference numerals have been used throughout to designate like elements.

FIG. 1 shows one embodiment of a solid ink, or phase change, ink printer 10. The solid ink printer includes an outer housing having a top surface 12 and side surfaces 14. A user interface display, such as a front panel display screen 16, displays information concerning the status of the printer, and user instructions. Buttons 18 or other control elements for controlling operation of the printer are adjacent the user interface window, or may be at other locations on the printer. An ink jet printing mechanism (not shown) is contained inside the housing. An ink feed system delivers ink to the printing mechanism. The ink feed system is contained under the top surface of the printer housing.

Figure 2:
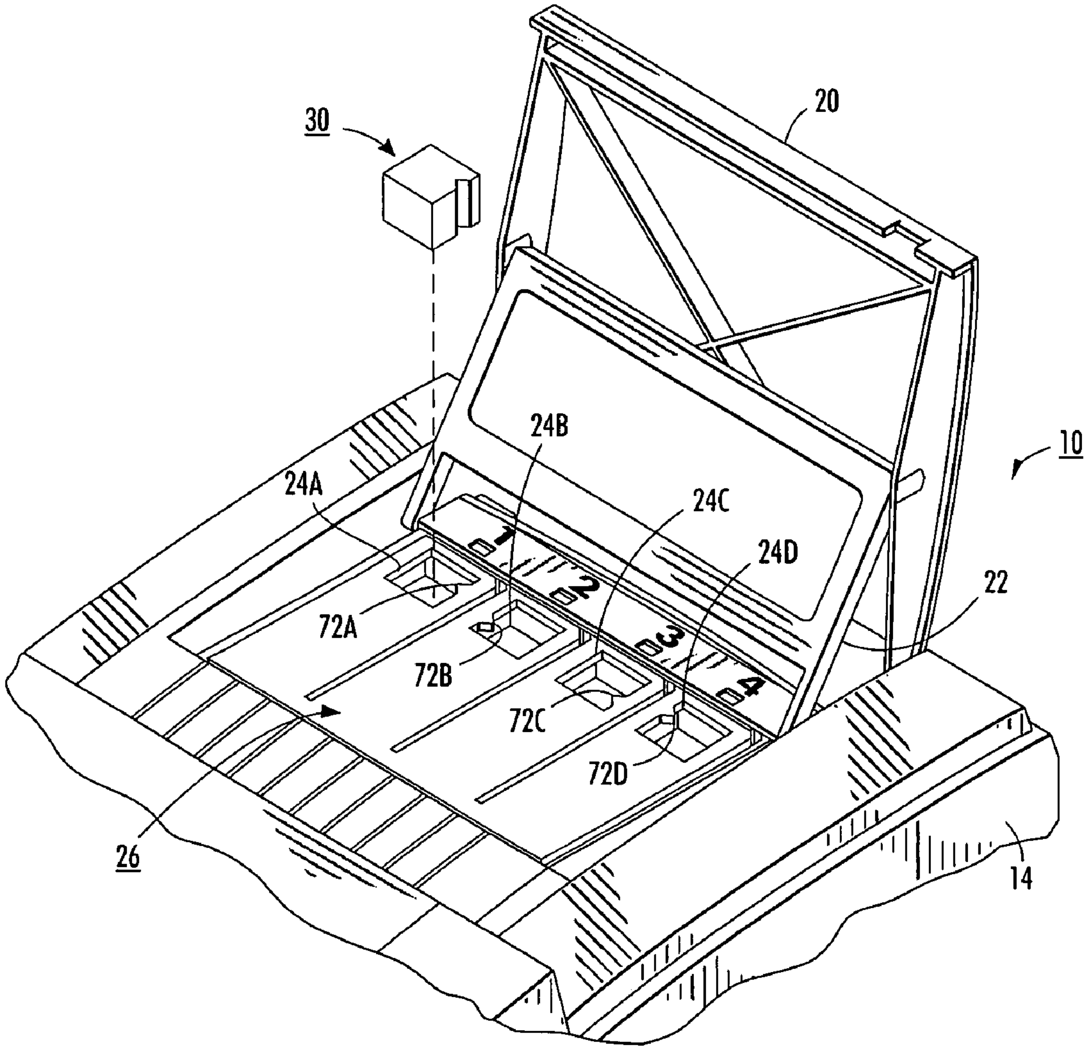
FIG. 2 PRIOR ART
FIG. 2 is an enlarged partial top perspective view of the prior art phase change printer with the ink access cover open, showing a solid ink stick in position to be loaded into a feed channel.

The top surface of the housing includes a hinged ink access cover 20 that opens as shown in FIG. 2, to provide the user access to an ink loader. In the particular printer shown, the ink access cover 20 is attached to an ink load linkage element 22 so that when the printer ink access cover 20 is raised, the ink load linkage 22 slides and pivots to an ink load position. The interaction of the ink access cover and the ink load linkage element is described in U.S. Pat. No. 5,861,903 for an Ink Feed System, issued Jan. 19, 1999 to Crawford et al., though with some differences noted below. As seen in FIG. 2, opening the ink access cover reveals a key plate 26 having keyed openings 24A, 24B, 24C, 24D. Each keyed opening 24A, 24B, 24C, 24D provides access to an insertion end of one of several individual feed channels of the solid ink loader.

Figure 3:
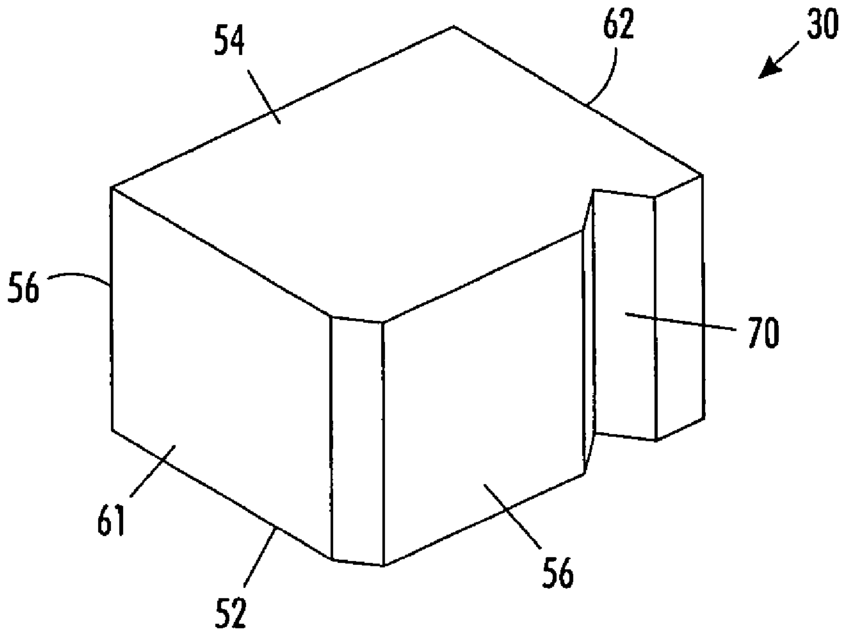
FIG. 3 is a perspective view of an embodiment of a solid ink stick.

An exemplary solid ink stick 30 for use in the feed system is illustrated in FIG. 3. The ink stick body is substantially cubic having a bottom, represented by a general bottom surface 52, and a top, represented by a general top surface 54. The top and bottom surfaces are shown substantially parallel to one another. However, the surfaces of the ink stick body are not necessarily flat, parallel or perpendicular to one another. Nevertheless, these descriptions will aid the reader in visualizing, even though the surfaces may have three dimensional topography, or be angled with respect to one another. The ink stick body also has a plurality of side extremities, such as side surfaces 56, 61, 62. The depicted embodiment includes four side surfaces, including two end surfaces 61, 62 and two lateral side surfaces 56. The lateral side surfaces 56 may be substantially parallel to one another, and are substantially perpendicular to the top and bottom surfaces 52, 54. The end surfaces 61, 62 are also substantially parallel one another, and substantially perpendicular to the top and bottom surfaces, and to the lateral side surfaces.

The ink stick is configured to fit into a feed channel with the two lateral side surfaces 56 of the ink stick body oriented along the longitudinal feed direction of the feed channel. The end surfaces of the ink stick shown in FIG. 3 are oriented more or less perpendicular to the feed path of the feed channel once the ink stick is inserted into the feed channel. One of the end surfaces 61 is a front or leading end surface, and the other end surface 62 is a rear or trailing end surface. The bottom surface has lateral edges at which the bottom surface 52 intersects the lateral side surfaces 56.

Ink sticks may include a number of features that aid in correct loading, guidance and support of the ink stick. These loading features, for example, may include keying, guiding, alignment, orientation, identification and/or sensor actuating features. The loading features may comprise protrusions and/or indentations that are located in different positions on an ink stick for interacting with key elements, guides, supports, sensors, etc. located in complementary positions in the ink loader. In addition, loading features may comprise surfaces that are positioned, angled and/or otherwise configured to aid a user in visually identifying the ink stick, orienting the ink stick correctly for insertion and selecting the correct keyed opening for insertion. These surfaces may also include marks and/or symbols such as color slot identifier, logo, or shop keeping unit (SKU) designation.

For example, the ink stick body of FIG. 3 includes a key element 70 of a particular predetermined size, shape, and location on the outer perimeter of the ink stick body. In the particular examples illustrated, the ink stick key element 70 is formed in the longitudinal perimeter segment formed by the outermost portion of the lateral side surface. For an ink stick of a particular color, the ink stick key element 70 matches a complementary key 72 formed in the perimeter of the keyed opening 24 in the key plate (See FIG. 2). The foregoing description should be sufficient for purposes of illustrating the general operation of a phase change ink jet printer and the solid ink sticks utilized by such printers.

Figure 4:
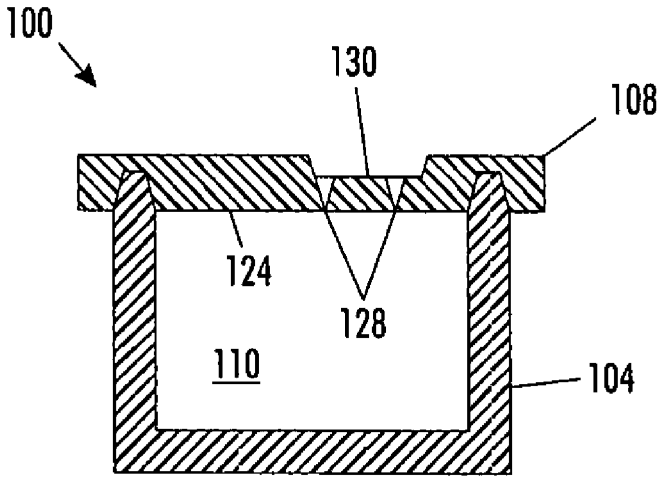
FIG. 4 is a cross-sectional view of an embodiment of a flexible molding tool for forming a solid ink stick.

An embodiment of a flexible molding tool for forming ink sticks is shown in FIG. 4. The flexible molding tool 100 may be constructed of a flexible, temperature resistant material. The material is able to withstand typical temperatures of molten ink without warpage or other adverse impact. Advantageously, the material retains its flexibility without undue risk of unintended deformation or breakage up to a temperature of approximately 80° C. to 100° C. This material has low surface adhesion for the various phase change ink materials that may be poured into the tool to form ink sticks. In one embodiment, the flexible molding tool is formed of a silicone material, although any suitable flexible material may be used, such as, for example, polysulfide or polyurethane compounds. The use of a flexible material, such as silicone, to construct the molding tool has the advantage that the molding tool may be flexed or distended to enlarge the cavity or portions of the cavity to facilitate ink stick extraction. The low adherence of the material allows the ink sticks to be removed with minimal or no sticking to the molding tool. The flexible molding tool may be formed using any suitable method, such as, for example, injection molding or compression molding.

In one embodiment, the molding tool comprises a two-piece molding tool as shown in FIG. 4. The exemplary molding tool of FIG. 4 comprises a vessel 104 and a lid 108. The vessel 104 and lid 108 mate to enclose a cavity 110 having a shape corresponding to the desired shape of an ink stick. The lid is depicted as topping the vessel and having little or no inset or depth, however, the vessel and the lid may both provide a portion or a substantial portion of the forming cavity. In the embodiments described below, a molding tool capable of producing a single ink stick is described. In another embodiment, a molding tool may be configured to produce a plurality of ink sticks simultaneously. For instance, a plurality of vessels and lids may be integrated into a frame to form a molding tool for forming multiple ink sticks simultaneously. The mold tool may be formed of more than two components. A portion of a mold tool may be rigid and may be incorporated into another part. Such an assembly may be facilitated by the flexible property of one or more mold components, such as by stretching around and sealing against one or more rigid components. Rigid materials may also be over molded with more flexible materials. These and other mold tool construction methods are appropriate to gain the advantages of the present concept of full or partial mold tool flexibility.

Figure 5:
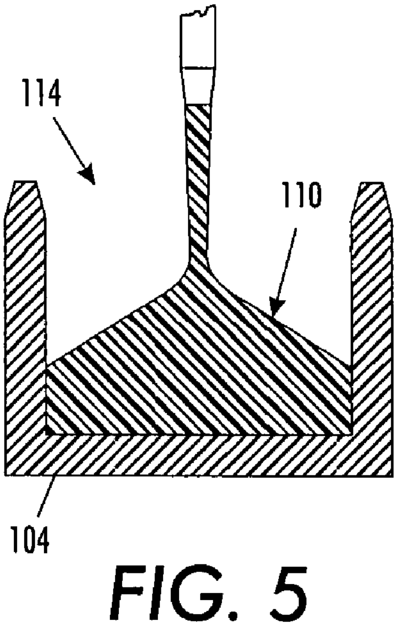
FIG. 5 is a cross-sectional view of the flexible molding tool of FIG. 4 being filled.

The vessel 104 has a hollow portion, or cavity, having one or more inner surfaces, or sidewalls, that define at least a portion of an ink stick shape. For example, in embodiments in which the molding tool is configured to form a spherical, or round ink stick, the cavity may include a single side wall defining at least a portion of the spherical ink stick shape. In embodiments in which the molding tool is configured to form an ink stick such as the ink stick of FIG. 3, the cavity includes five sidewalls, or four sidewalls and a bottom. Molten ink material may be fed through the opening 114 into the cavity 110 (FIG. 5). The open top 114 may extend over a portion of the vessel or over the entire vessel so that only a portion or the entire top of the vessel is open, respectively. The inner surfaces of the sidewalls and bottom need not correspond to the bottom and sides of the ink stick, the stick being oriented differently in use than during the manufacturing process. Any or all of the side walls, bottom and top or other forming surface may include inset and/or protruding features or three dimensional shapes. These three dimensional shapes, features or forms may provide aesthetic benefit, visual cues and/or may be used as differentiators between sticks of a set or between multiple sets of ink.

Figure 6:
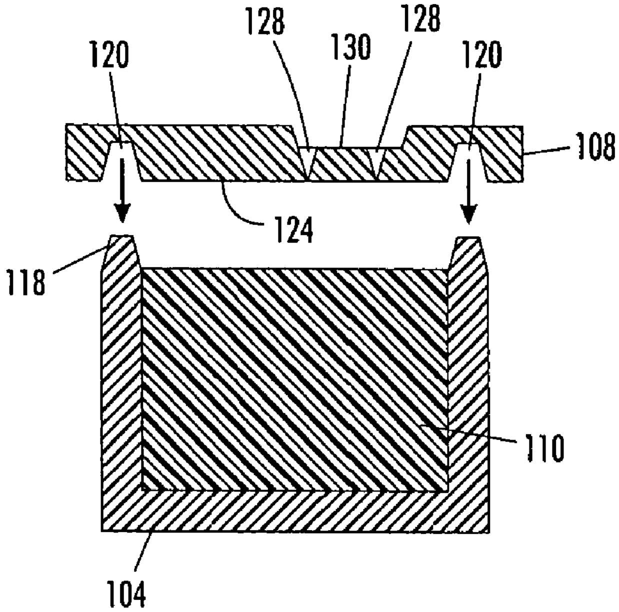
FIG. 6 is a cross-sectional view of the flexible molding tool of FIG. 4 being closed.
Figure 7:
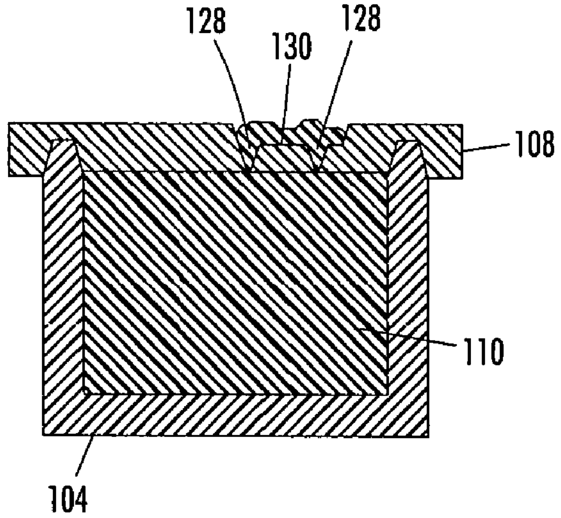
FIG. 7 is a cross-sectional view of the flexible molding tool of FIG. 4 after it has been closed.

After the molten ink material has been received in the hollow of the vessel (FIG. 5), the lid 108 may be placed over the opening 114 of the vessel to enclose the cavity 110 (FIG. 6). The lid 108 may include interface features 120 for mating with the complementary interface features 118 that may be formed on the end surfaces of the sidewalls of the vessel 104 or along the rim of the opening. (FIG. 6). These features enable the lid 108 to be releasably secured to the vessel 104 after the ink has been introduced into the cavity (FIG. 7). Although, the lid and vessels in the described embodiments have complementary interface features for securing the molding tools together, any suitable method may be used to ensure that the lid remains in position on the vessel so that the opening is covered and the cavity is enclosed during the solidification of the ink stick material in the tool. For instance, the lid and vessel may be pressed and held together in a vise-like apparatus.

Figure 11A:
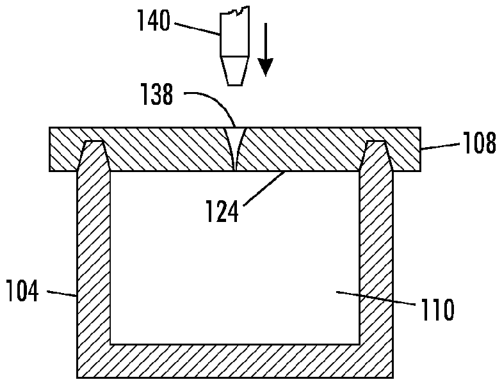
FIG. 11A is a cross-section view of an embodiment of a flexible molding tool for forming a solid ink stick.
Figure 11B:
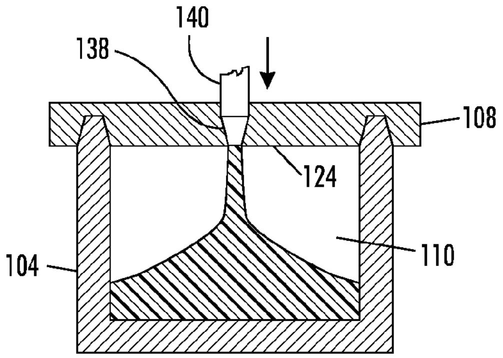
FIG. 11B is a cross-sectional view of the flexible molding tool of FIG. 11A being filled by low pressure injection.
Figure 11C:
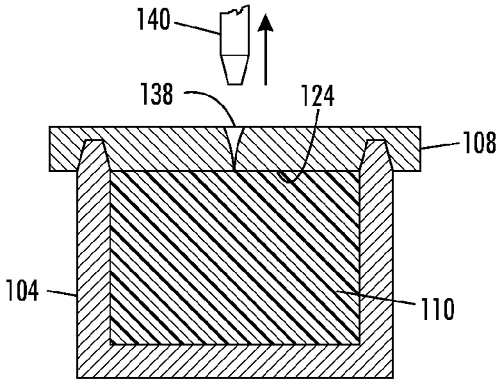
FIG. 11C is a cross-sectional view of the flexible molding tool of FIG. 11A after it has been filled.

In an alternative implementation, ink may be injected under low pressure into the tool cavity while the lid is in place such that the process closely resembles a more typical injection mold method. With that approach the inlet may be an orifice located at any point on either the vessel or lid. Multiple inlet orifices could be used. An injection orifice may be configured with flexibility such that it self closes when an external delivery tube, jet, conduit or other liquid ink supply device is withdrawn. For example, referring to FIGS. 11A-C, a flexible injection opening 138 may be formed in the lid 108, although the opening or multiple openings may be formed in any suitable surface of the vessel 104 or lid 108. FIG. 11A shows the flexible opening in a closed state prior to insertion of the injecting nozzle 140. The opening 138 is configured to flex to allow insertion of the nozzle 140 so that ink may be injected into the enclosed cavity 110 of the molding tool as shown in FIG. 11B. Once the molten ink has been delivered into the cavity 110, the nozzle may be withdrawn from the flexible opening thereby allowing the flexible opening to close as shown in FIG. 11C.

The lid 108 includes a lower surface having molding features 124 (FIG. 4 and FIG. 6) that are configured to form features in the ink material exposed at the opening of the cavity 110. These features may comprise key elements, guide features, nomenclature marks, orientation features, etc. When placed together, lid 108 and the inner surface of the cavity 110, such as the bottom and sidewalls, define an ink stick shape that includes the features as well as a fixed height. The fully enclosed cavity 110 of the molding tool promotes a substantially even rate of cooling over the entire surface area of the ink material in the molding tool.

The inner surfaces of the vessel and the molding surface of the lid may be designed to produce any desired configuration of a solid ink stick. Moreover, the enclosed volume may include protrusions, indentations and/or visually recognizable symbols formed in predetermined locations in order to impart keying and orientation features to the surfaces the ink material in addition to giving the ink material its general shape.

Figure 8:
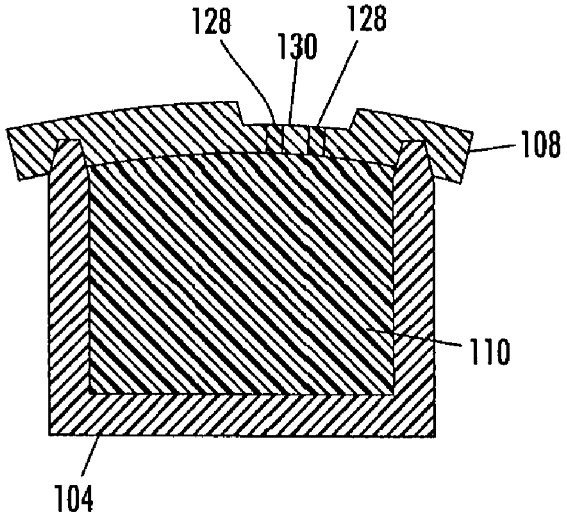
FIG. 8 is a cross-sectional view of the flexible molding tool of FIG. 4 showing ink under pressure in the cavity.

To ensure that the molten ink completely fills the cavity of the vessel when the lid covers the opening of the vessel, an excess amount of molten ink may be introduced into the cavity. To compensate for the excess volume of ink, the flexible molding tool may include overflow passages so a portion of the molten ink can flow out of the enclosed cavity where it may be collected and reused. In one embodiment, the overflow passages may be formed in the lid of the molding tool so that the ink under pressure may flow through the passages in the lid to be collected on an upper surface of the molding tool. For example, the lid may include slits 128. As the lid is placed over the opening, excess ink in the cavity 110 of the molding tool distends the lid 108, as shown in FIG. 8, and opens the slits 128 (FIG. 4 and FIG. 6). The open slits 128 allow some ink under pressure in the cavity 110 to flow through the slits to a receiving area 130 (FIG. 4 and FIG. 6) on the lid as shown in FIG. 7. Once the pressurized ink in the cavity 110 is equalized, the lid recovers its original shape so the slits close. When a cavity is configured to inject ink into an assembled vessel and lid, air escaping slits or orifices can be used to evacuate the air. Over filling in this case is also possible to ensure optimal and full shape compliance similar to overfilling the cavity and then installing the lid. In either case, the overflow passage may also permit venting of air entrapment in the cavity.

In one embodiment, the flexibility of the surfaces of the cavity and the lid may be controlled so portions of the molding tool are more or less flexible than other portions of the molding tool. By varying the flexibility of areas of the mold, select portions of the molding tool may be configured to expand and/or contract with the ink material to reduce stress in the ink and improve dimensional uniformity from stick to stick. Such a molding tool helps ensure that the final ink stick shape is within desired tolerance levels for appearance, performance, etc. In one embodiment, the flexibility of portions of the molding tool may be controlled by varying the thickness of the molding tool in selected areas. For example, areas of the molding tool that are desired to flex may be thinner than other portions of the molding tool. More rigid materials may be used in areas not requiring significant flex for forming or release so the vessel and/or lid may be comprised of single or multiple materials. Selectively choosing the degree of flexure in various regions of the tool promotes shape retention and ease of release and also enables moderate overflow swelling of the cavity such that ink shrinks to a more nominally desired size and/or shape as it cools. In addition or as an alternate to cavity swelling, the overflow passage receiving area may provide surplus ink that can be drawn into the inner ink forming cavity to compensate for shrinkage of the solidifying ink.

Figure 10:
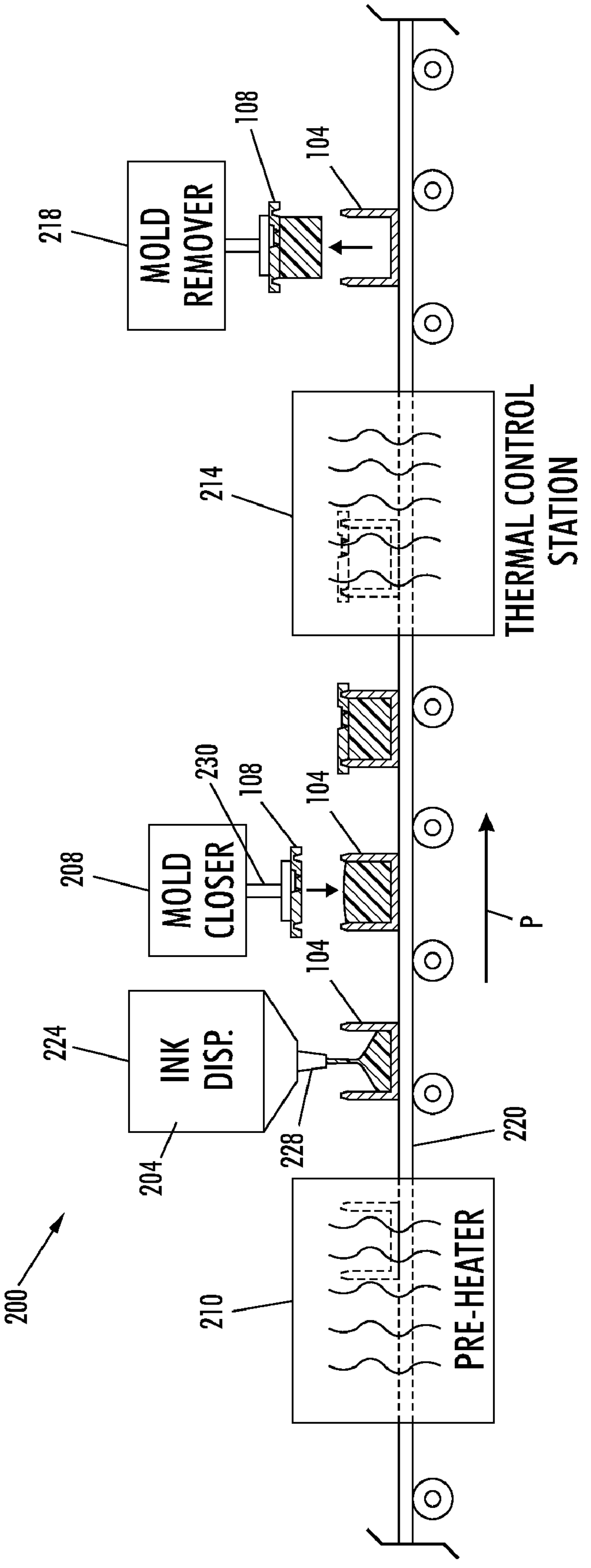
FIG. 10 is a schematic view of a system for forming solid ink sticks using the flexible molding tool of FIG. 4.

FIG. 10 is a simplified schematic diagram of a system 200 that uses the flexible molding tool described above to form ink sticks. The system 200 includes at least one flexible molding tool, a molding tool closer 208, and an ink stick extractor 218. The dispenser 204 introduces molten phase change ink material into the cavity of a vessel. The molding tool closer 208 places a lid on the vessel to enclose the ink material in the cavity of the molding tool. The ink stick extractor 218 is configured to remove fully or partially solidified ink sticks from the flexible molding tool. The extractor may include a feature that the fully or partially solidified ink grips due to geometry and controlled flex and/or may be augmented by expanding the cavity for easier release of the stick by injecting air into it or by using vacuum or external devices to pull appropriate portions of the cavity walls outwardly. The extractor may be a component of the mold tool separate from but forming a part of the vessel and/or lid as these components come together to create an enclosed cavity. As shown in the embodiment, one or more molding tools may be stationed on a conveyor 220 and transported from station to station during the fabrication process. Alternatively, the system 200 may be configured such that the flexible molding tool(s) remain stationary and the various processing steps are performed in situ. Thus, the various actions and mechanisms may be arranged and articulated to accomplish the various steps in only one station or any number of stations.

In one embodiment, the molten ink dispenser 204 comprises a molten ink reservoir or hopper 224 and one or more ink dispensers 228. The hopper 224 holds the molten ink and the dispensers 228 release the molten ink from the hopper 224 so it flows into the cavity of a molding tool vessel 104. The molten ink hopper 224 may include a heating element (not shown) for maintaining the ink in the hopper in a molten state. An ink dispenser 228 includes a valve, which is operated to dispense a predetermined amount of molten ink into the cavity. The molten ink may be gravity fed through an opening in the ink dispensers although any suitable method of dispensing the ink into the cavities may be used, such as pressurized flow or positive displacement. In the embodiment described above, the opening through which the ink is dispensed is located at the top of the cavity. In other embodiments of the molding tool, the opening through which ink is supplied to the vessel may be provided in a sidewall or bottom of the vessel. The flexibility of the material used to form the molding tool allows the openings in the walls or bottom to flex open for delivery of the ink material and then recover, or close, when the delivery of the ink material is completed.

Prior to dispensing the molten ink into the cavities of the vessels, the vessels may be heated by a preheater 210. Preheating of the vessels helps prevent molten ink from solidifying in the vessel prior to the cavity being completely filled. Preventing premature solidification of the molten ink helps reduce flaws in the surface of the ink stick. In addition, preheating the cavities may facilitate the spreading of the ink over the surfaces of the cavity without formation of voids or the like. The preheating temperatures and times may vary depending upon the size, design complexity, ink material and mold tool material employed.

Once the molten ink has been introduced into the cavity of the illustrated open top vessel 104, the lid 108 is placed over the opening of the vessel to enclose the molten ink material in the molding tool. In the embodiment of FIG. 10, an automatic mold closer 208 is used, although the lid may be manually placed over the opening. The mold closer 208 includes a robotic arm 230 that is configured to press the lid 108 onto the vessel 104 so that the complementary interface features of the upper and vessel mate. Pneumatic rams or other known mechanical or electromechanical devices may also be used to position lids on the vessels. Similarly, rams or other devices may be used to temporarily confine or influence the shape of the flexible areas of the mold as the ink cools.

After the molten ink material is enclosed in the cavity of the flexible molding tool, the tool may be placed in a staging area during solidification of the ink. The system may include a thermal control station 214 to encourage solidification. The thermal control station 214 is configured to extract heat from the ink material in a controlled manner. In FIG. 10, the thermal control station 214 comprises a cooling tunnel having an electrical fan for circulating air over the exterior surfaces of the molding tools. The mold tool may be moved into a thermal control station or a movable thermal control station or envelope may be placed fully or partially around the mold tool. Any suitable method of enhancing solidification may be used, however, including, for example, air flow or dipping or immersing the molding tools in a cold fluid bath.

The flexible molding tool may allow greater flexibility or reduced time in the mold. A fully or partially flexible mold tool is able to moderately change shape as the ink material cools and shrinks, reducing stress and resulting cracks. The structural demands of the high friction release from conventional rigid molding tools require a significant degree of solidification before ink sticks may be removed. The flexible molding tool described above reduces friction during release of an ink stick. Consequently, ink sticks may be removed while the inner core of the ink stick is still molten. Once released, the full outer surface may provide more uniform cooling and/or respond more readily to any cooling influence. Thus, deformation and stress cracking may be further minimized.

Figure 9:
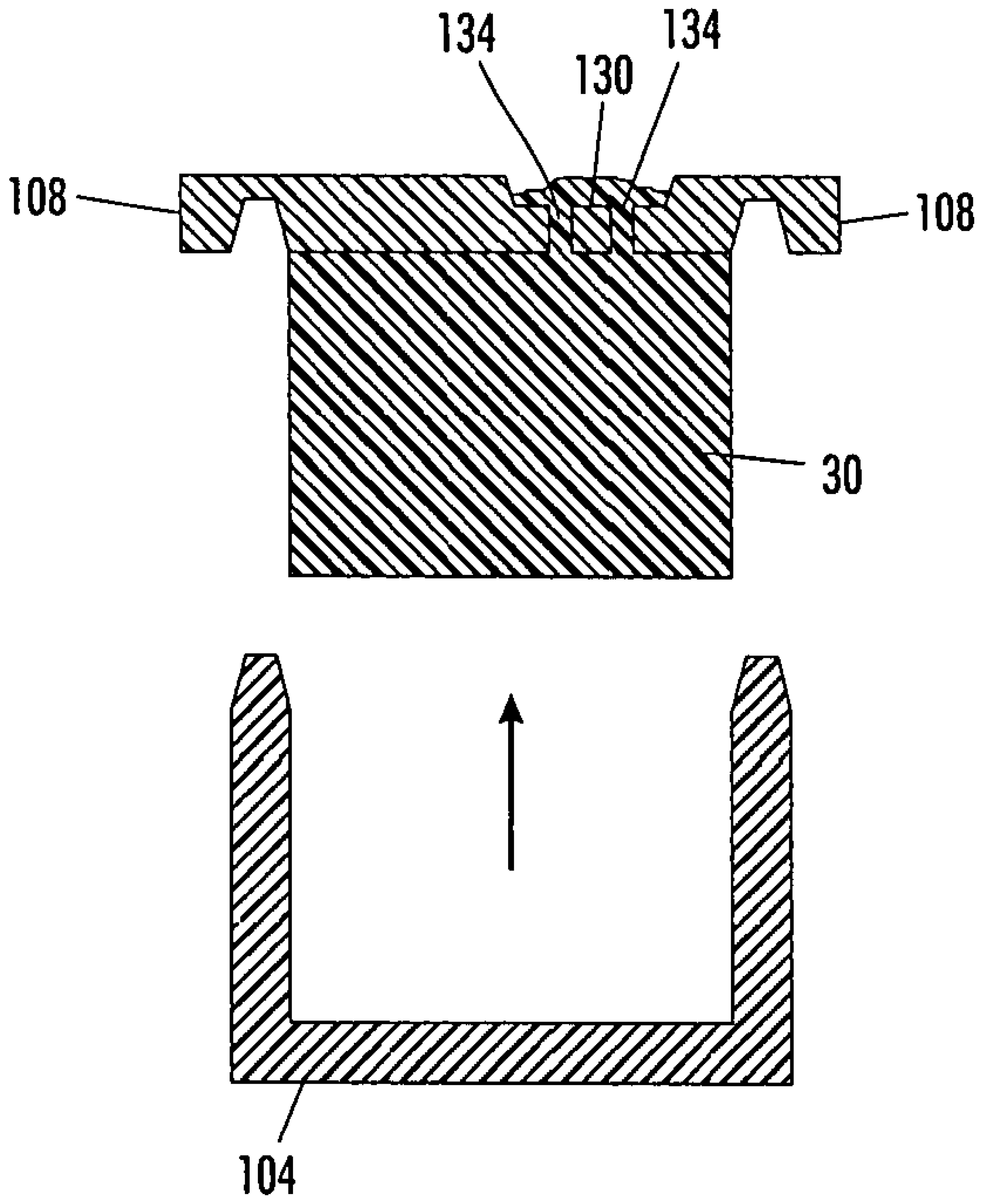
FIG. 9 is a cross-sectional view of the flexible molding tool of FIG. 4 showing a method of extraction of the ink stick.

A partially solidified ink stick may be removed from the flexible molding tool with a variety of methods. The method of removal depends on a number of factors including, for example, the configuration of the ink stick, the molding tool design, and the flexibility of the molding tool. In the embodiment of FIG. 10, an automated ink stick extractor 218 is used. In the embodiment illustrated, the lid 108 may be configured to “hold” the ink stick so removal of the lid also extracts the ink stick from the vessel as shown in FIGS. 9 and 10. The lid 108 may include openings 134 that allow molten ink to escape the cavity and solidify in the receiving area 130. During removal of the lid 108, the ink stick 30 remains attached to the solidified ink in the receiving area 130 via the openings 134 and is extracted from the vessel where it can be broken free by hand or a mechanized detachment, retrieval or placement device.

Other removal methods comprise placing the flexible molding tool in a vacuum chamber, or pot, for ink stick extraction. The vacuum in the chamber distends or expands the walls of the molding tool to permit removal of the ink stick. Similarly, pressurized air or fluid may be introduced into the cavity to expand the walls of the tool. In another method, expansion pockets may be formed in the walls of the molding tool that may be expanded, for example, by air or fluid, during solidification and then subsequently evacuated to provide spacing in the cavity to remove an ink stick. Such pockets may be configured to augment stick removal by subjecting them to vacuum pressure. Expansion pockets and/or flexible regions of the mold enable moderate overfill which need not be fully evacuated prior to initiation of solidification so that the cooling ink shrinks to a nominal shape that is closer to an intended size and/or form.

Once an ink stick has been removed from the molding tool, the ink stick may be packaged or further processed. In one embodiment, the system may include a flashing remover for trimming or otherwise removing flashing from the ink sticks. Flashing comprises webs or trails of ink material that are formed on the ink stick at junctures or seams in the molding tool. The flashing may be removed using any suitable method. For instance, the nature of the ink material allows flashing to be removed by a brief exposure to heat for melting the flashing or by a directional air jet blast or any combination of these or other methods.

Those skilled in the art will recognize that numerous modifications can be made to the specific implementations described above. Those skilled in the art will recognize that the ink sticks may be formed in numerous shapes and configurations other than those illustrated. In addition, numerous other configurations of the stations, sections and other components of the ink stick forming system can be constructed within the scope of the disclosure. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A system for forming solid ink sticks, the system comprising:

at least one flexible molding tool having a vessel with a sidewall defining a cavity for receiving molten phase change ink material, the cavity defining at least a portion of an ink stick shape, the flexible molding tool being of a flexible, temperature resistant material to enable the sidewall to facilitate release of an at least partially solidified ink stick from the cavity;

a molten phase change ink dispenser for introducing molten phase change ink material into the at least one cavity of the at least one flexible molding tool;

a lid partially comprised of a flexible, temperature resistant material having an overflow passage and a receiving area, the lid being configured to enclose the cavity filled with molten phase change ink material and the overflow passage being configured to distend to enable a portion of the molten phase change material to flow through the overflow passage and solidify in the receiving area, the receiving area being recessed with respect to an upper surface of the lid and positioned on the lid to enable the solidified molten phase change ink material in the receiving area to capture a portion of the lid between the solidified molten phase change ink in the receiving area and solidified phase change ink in the cavity to couple the lid to the solidified phase change ink material in the cavity; and an ink stick extractor configured to grip the lid and withdraw the partially solidified ink stick from the cavity.

2. The system of claim 1, the at least one flexible molding tool being at least partially composed of a compound including silicone.

3. The system of claim 1, the overflow passage further comprising at least one slit, the at least one slit being configured to flex to enable insertion of a nozzle through the lid for dispensing of the molten phase change ink material into the cavity and to close upon removal of the nozzle, the slit also being configured to distend in response to pressure in the cavity produced by overfilling the cavity with molten phase change ink material.

4. The system of claim 1, the lid including at least one injection opening at least partially formed of the flexible, temperature resistant material.

5. The system of claim 4, wherein the flexible, temperature resistant material is at least partially composed of a compound including silicone.

6. A system for forming solid ink sticks, the system comprising:

a vessel with a sidewall defining a cavity that is configured to be filled with molten phase change ink material to form an ink stick;

a molten phase change ink dispenser for filling the cavity of the vessel with molten phase change ink material;

a flexible lid having an overflow passage and a receiving area, the lid being at least partially formed of a flexible, temperature resistant material and configured to mate with the vessel filled with molten phase change ink material to cover the molten phase change ink material and the overflow passage being configured to distend to enable a portion of the molten phase change ink material to flow from the cavity through the overflow passage to the receiving area and solidify in the receiving area, the portion of the phase change ink material in the receiving area capturing a portion of the lid between the phase change ink material in the cavity and the portion of the phase change ink material in the receiving area in response to the molten phase change ink material in the receiving area and the cavity at least partially solidifying; and an ink stick extractor configured to grip the lid and withdraw the at least partially solidified ink stick from the cavity.

7. The system of claim 6, the flexible lid being at least partially composed of a compound including silicone.

* * * * *